Figure 1:
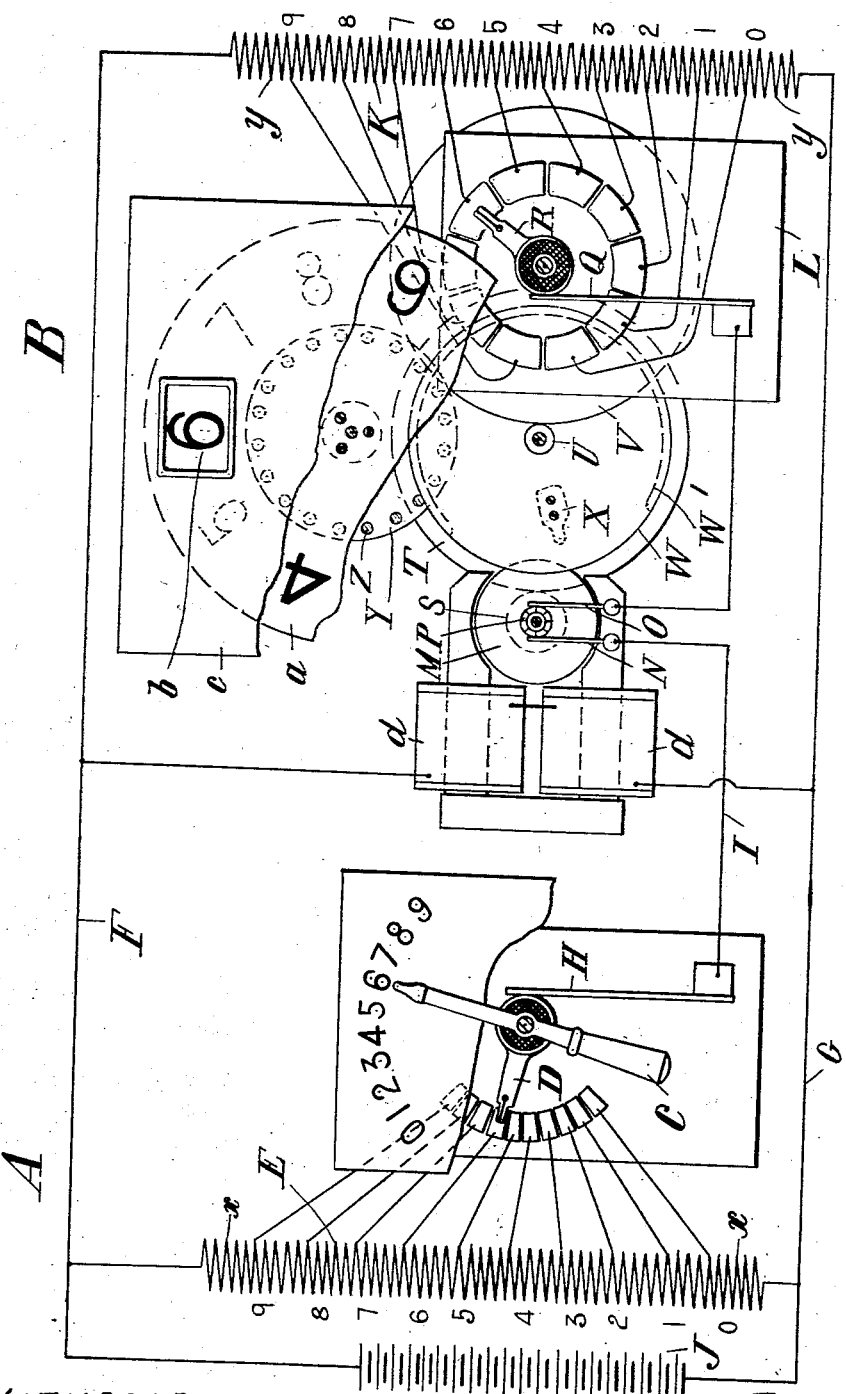

No. 877,312. PATENTED JAN. 21, 1908.
S. EVERSHED.
ELECTRICAL TRANSMISSION APPARATUS.
APPLICATION FILED FEB. 28, 1906.
6 SHEETS—SHEET 1.

WITNESSES
W. P. Burke
W. J. Owhover

INVENTOR
Sydney Evershed
BY Richards
ATTYS

No. 877,312.

PATENTED JAN. 21, 1908.

S. EVERSHED.
ELECTRICAL TRANSMISSION APPARATUS.
APPLICATION FILED FEB. 28, 1906.

6 SHEETS—SHEET 3.

WITNESSES

INVENTOR
Sydney Evershed
BY
ATTYS

No. 877,312.  
PATENTED JAN. 21, 1908.  
S. EVERSHED.  
ELECTRICAL TRANSMISSION APPARATUS.  
APPLICATION FILED FEB. 28, 1906.  
6 SHEETS—SHEET 4.

WITNESSES  
INVENTOR  
Sydney Evershed  
BY Richard  
ATTYS

UNITED STATES PATENT OFFICE.

SYDNEY EVERSHED, OF CHISWICK, ENGLAND, ASSIGNOR TO HIMSELF AND EVERSHED AND VIGNOLES LIMITED, OF LONDON, ENGLAND, A CORPORATION.

ELECTRICAL TRANSMISSION APPARATUS.

No. 877,312.  Specification of Letters Patent.  Patented Jan. 21, 1908.

Application filed February 28, 1906. Serial No. 303,556.

*To all whom it may concern:*

Be it known that I, SYDNEY EVERSHED, a subject of the King of Great Britain and Ireland, residing at Chiswick, county of Middlesex, England, have invented new and useful Improvements in Electrical Transmission Apparatus, of which the following is a specification.

My invention is applicable to any purpose requiring distant mechanisms to be moved automatically or at will by definite amounts, and is particularly applicable to ships' telegraphs, steering gear, and other means of communication or control required on board ship; to train despatching telegraphs, mining telegraphs, engine room or power house telegraphs and other purposes, requiring a similar correspondence in the motion or position of two or more pieces of mechanism.

My invention is based upon a principle analogous to the Wheatstone bridge, an electric motor taking the place of the galvanometer in the bridge. This principle as heretofore applied for repeating movements at a distance, wastes a large amount of energy in comparison with the useful work done, and has the further defect that owing to the friction, hysteresis and other retarding forces acting on the bridge motor, the correspondence between the transmitting and receiving devices is by no means exact.

The objects of my invention are to make the correspondence between the transmitting and receiving appliances as precise as the limitations of workmanship will permit; to lessen the waste of electrical energy in the necessary resistances and to lessen the time occupied by the distant mechanisms in moving into correspondence with the transmitting mechanisms.

In describing my invention I shall assume, as a typical example, that it is to be applied to a simple telegraph, such as is required for transmitting orders from the bridge of a ship to the engine room, or from the pit head of a colliery to the bottom of the shaft. The transmitter will be a multiple point switch adapted to make contact at any one of a number of points upon a subdivided resistance. The receiver will contain a corresponding switch and a similarly subdivided resistance. The two resistances will be connected in parallel on the same supply circuit, and the arms of the two switches will be connected by a wire, hereinafter called the balancing wire. At the receiver, a motor is inserted in the balancing wire and the switch arm is connected with the motor spindle by suitable gearing. The motor is also geared to a drum or disk upon which the required orders are marked, only one order at a time being visible through a hole in a dial. When in a normal condition the transmitting switch and the receiving switch will stand at corresponding points causing the balancing wire to make contact with points on the two resistances which are at the same potential. Hence no current will flow in the balancing wire and motor. If now the transmitter switch is moved over one or more contacts and brought to rest at another point, the balance is disturbed, a current will flow in the balancing wire and traversing the motor, will cause it to rotate. The motor will then move the receiving switch towards a point on the resistance of the same potential as that at which the transmitter stands, gradually reducing the balancing current as it does so, until the torque due to the current is just insufficient to overcome the retarding forces acting upon the motor. The receiving switch arm will therefore fall short of exact correspondence with the transmitter when the motor stops, and the signal drum will fall short of the required position to a corresponding degree. This falling short of the right position is analogous to the back lash of gear wheels and is herein referred to as the back-lash of the motor. The effect of the motor back-lash is greatly accentuated by the fact that immediately the receiving switch arm just touches the contact corresponding with that at which the transmitter switch stands, the balancing current drops very nearly to zero; so that the motor will sometimes stop when the switch arm is almost half a contact breadth short of the proper position, and the signal drum may fall short by nearly half the spaces of one order.

According to my invention this liability to fall short of exact correspondence may be eliminated either by the interposition of a discontinuous gear between the motor and the signal drum, or by means of duplicated contacts and auxiliary resistances in the receiver. For the first method I use ordinary continuous toothed gearing to connect the motor to the switch, but I cause the motor to drive the signal drum by means of any known form of discontinuous gearing for imparting intermittent motion, such as the well known ten to one gear employed in the Harding counter known as the Veeder counter or cyclometer or the ten to one counter gear illustrated in Fig. 3 of U. S. A. Patent Specification No. 297670 issued 29th April, 1884 to Cyrus Chambers, Jr. With this arrangement the motor, after having moved the signal drum from one signal to the next, is free to make a certain number of revolutions, without again moving the drum; and so long as it has made rather more than half the number of revolutions that correspond with a change of one signal, the exact position in which it comes to rest has no effect upon the position of the drum. Hence the motor and switch arm may fall short of exact correspondence with the transmitter without in any way interfering with the position of the drum, which will always correspond exactly with the transmitter.

For my second method I double the number of subdivisions in the receiver resistance, and duplicate the switch contacts by the insertion of a half-way contact between each two successive signal contacts. My object being to maintain the want of electrical balance until the switch arm is not merely touching the right signal contact, but actually resting at the center of its breadth, I insert an auxiliary resistance between each signal contact and the point on the receiver resistance to which it is connected. By making this auxiliary resistance as much as four or five times the resistance of one subdivision of the receiver resistance, no appreciable change takes place in the want of electrical balance when the switch arm bridges across from a half-way contact to an adjacent signal contact and hence the balancing current is maintained at very nearly its full strength until the switch arm has traveled entirely off the half-way contact on to the middle of the signal contact. To avoid back-lash in the switch itself, the switch arm must be made broad enough to more than cover the width of a signal contact, so that when at rest centrally on any signal contact it very nearly touches the adjacent half-way contacts on either side of the signal contact. With this arrangement and construction it is impossible for the switch arm to rest anywhere but on the middle of the signal contact corresponding with the position of the transmitter switch; for if it is moved slightly in one direction or the other it comes into contact with the adjacent half-way contact on one side or the other. The full balancing current then immediately traverses the motor which revolves until it has restored the switch to its correct position.

In some applications of the bridge motor principle the waste of energy in the resistances is not of much importance, but when the transmitting and receiving devices with their resistances are completely inclosed in boxes or cases it is essential that the energy consumption should be reduced as much as possible. The current which will flow in the balancing wire when the transmitting and receiving switches are not on corresponding contacts, is a maximum when the motor is at rest; and under these conditions it follows the same law as the current in the galvanometer of a Wheatstone bridge. That is to say, its value for any given voltage depends very largely upon the value of the transmitting and receiving resistances, and the power received by the motor is limited by the permissible waste of energy in them. The torque of the motor may be increased to any extent at the cost of a reduction in its speed of working, but the electrical power received by the motor can only be increased by increasing the waste of energy in the resistances.

In order that my invention may be the better understood, I will now describe it with reference to the accompanying drawings of which:—

Figure 2:
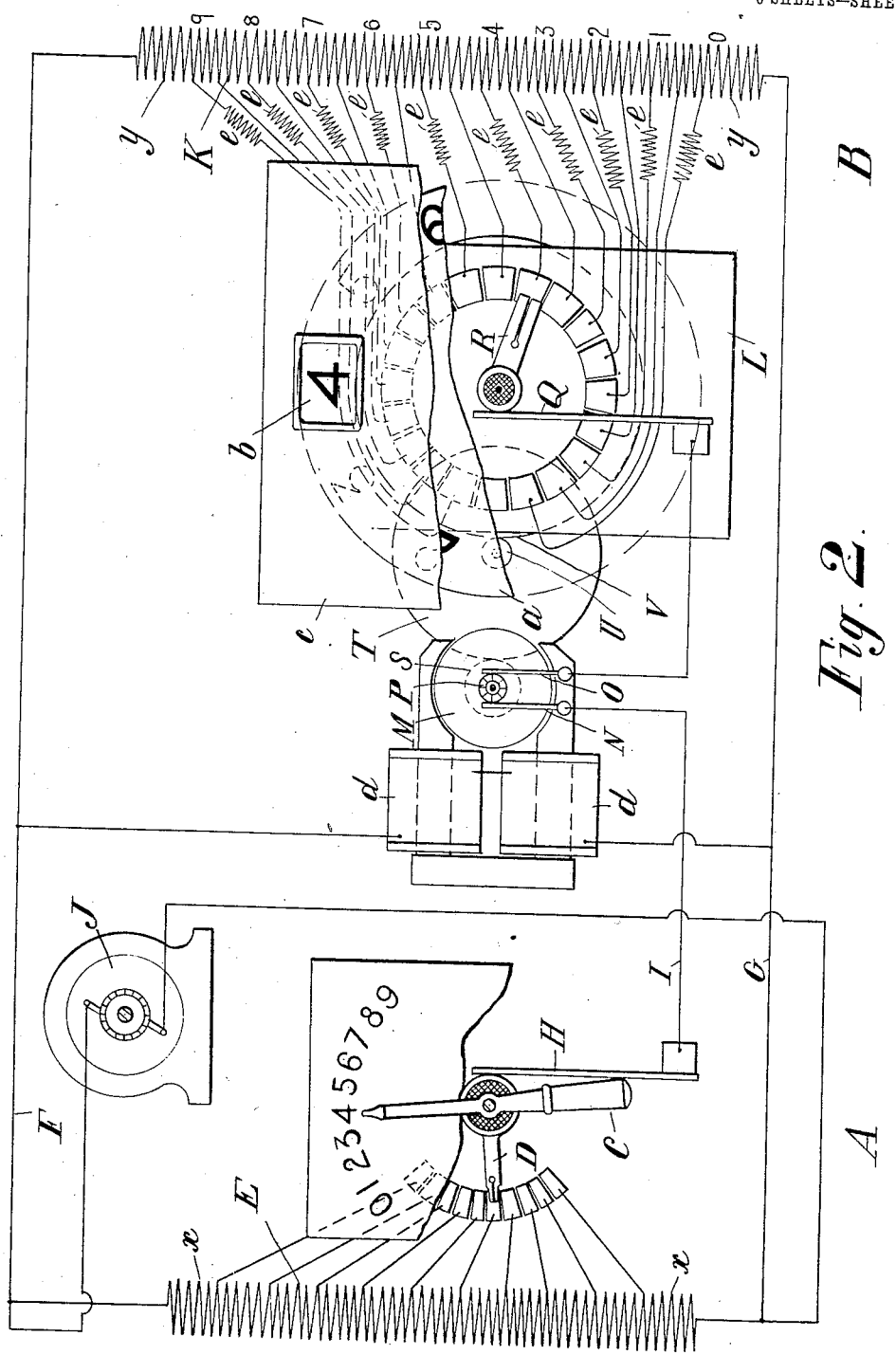
Figure 3:
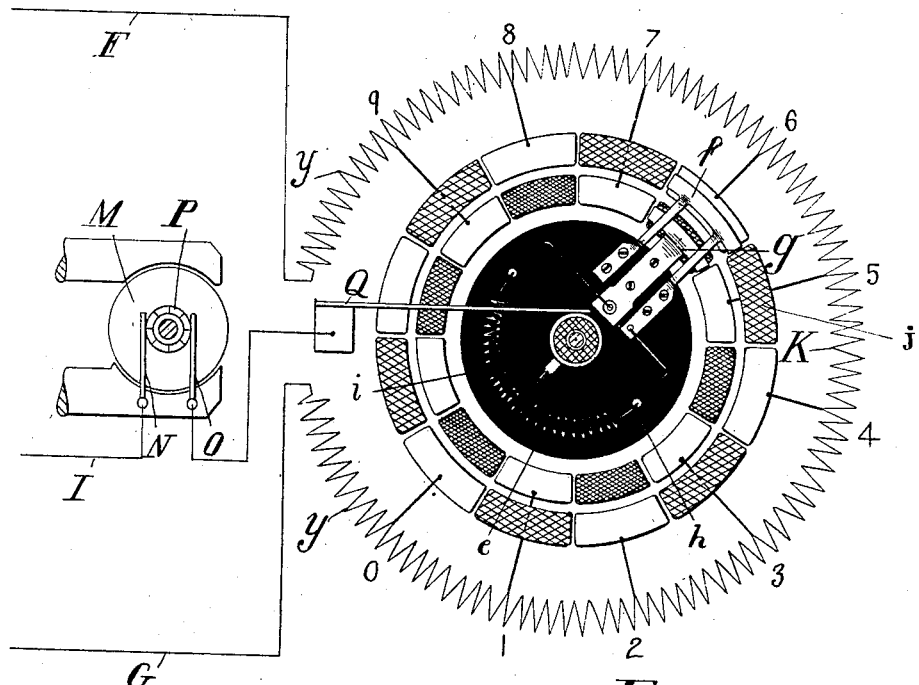
Figure 4:
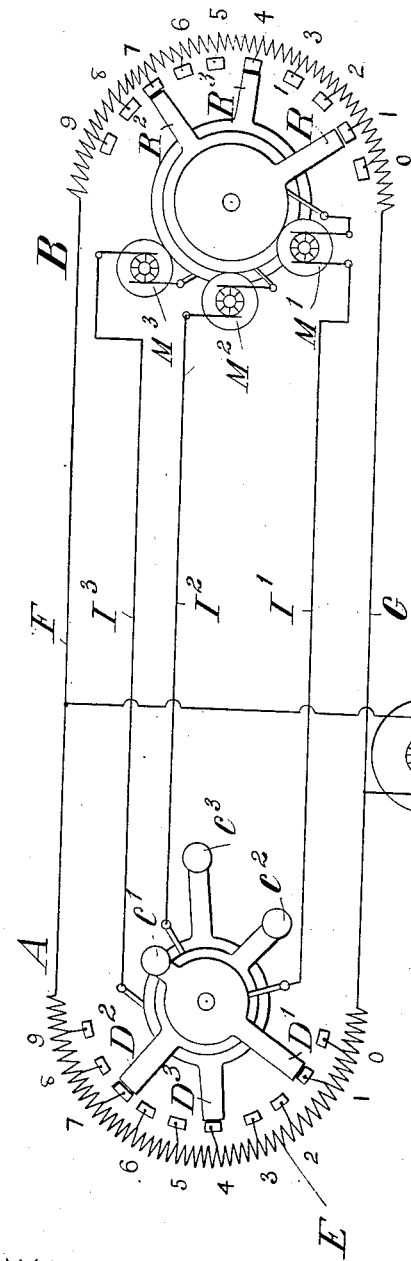
Figure 5:
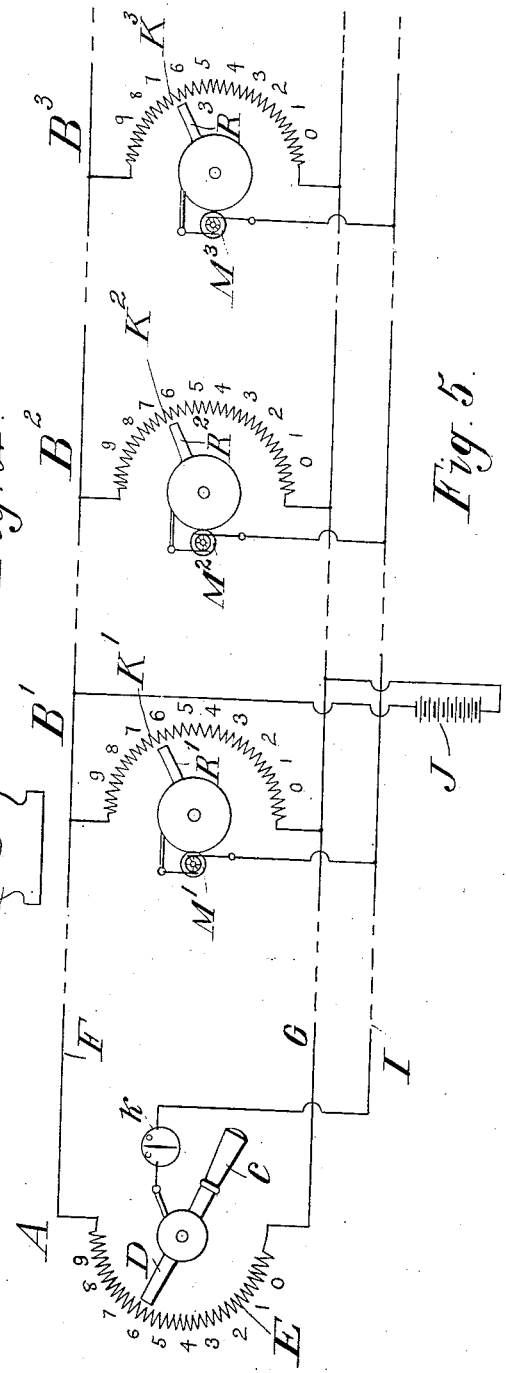
Figure 6:
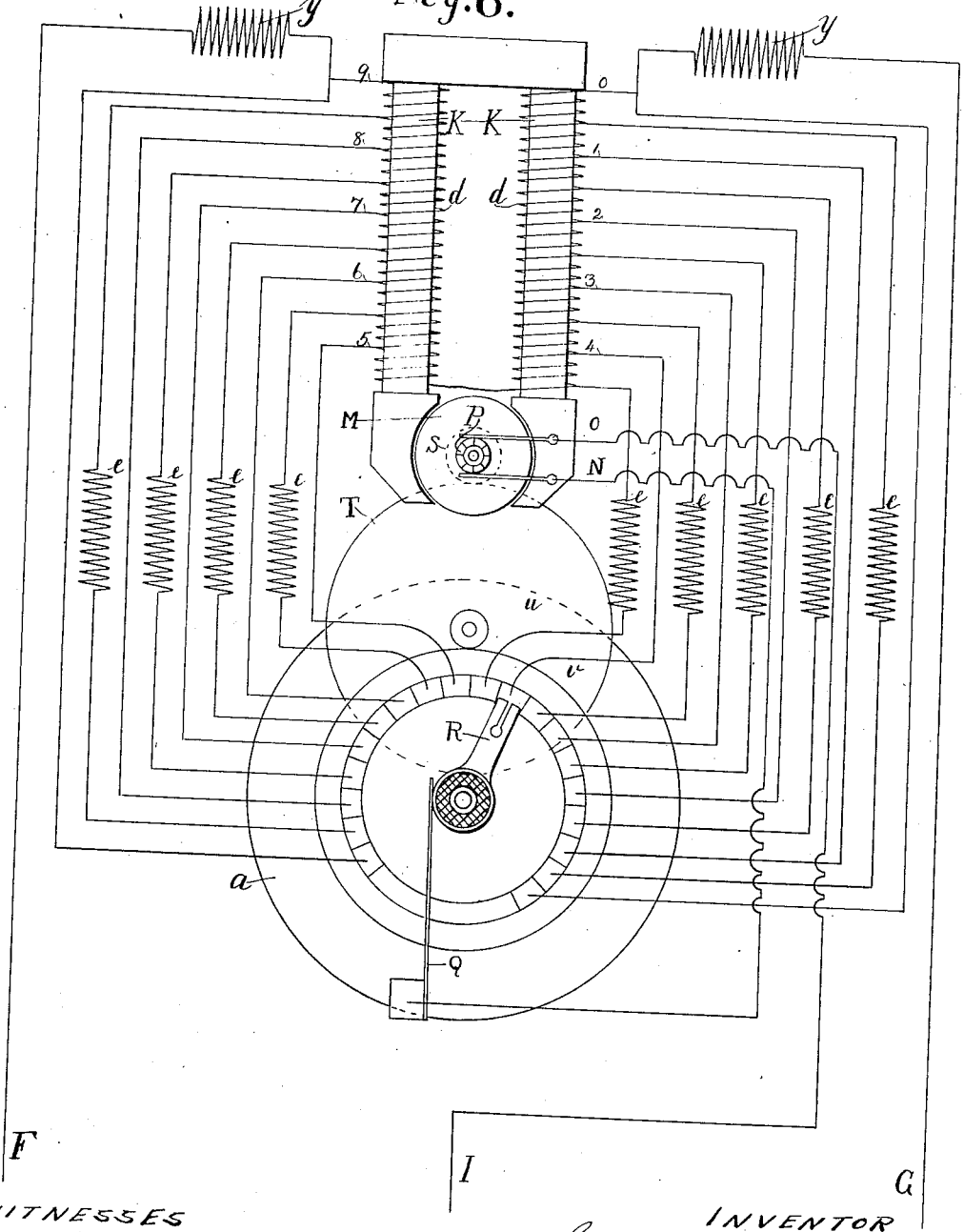
Figure 7:
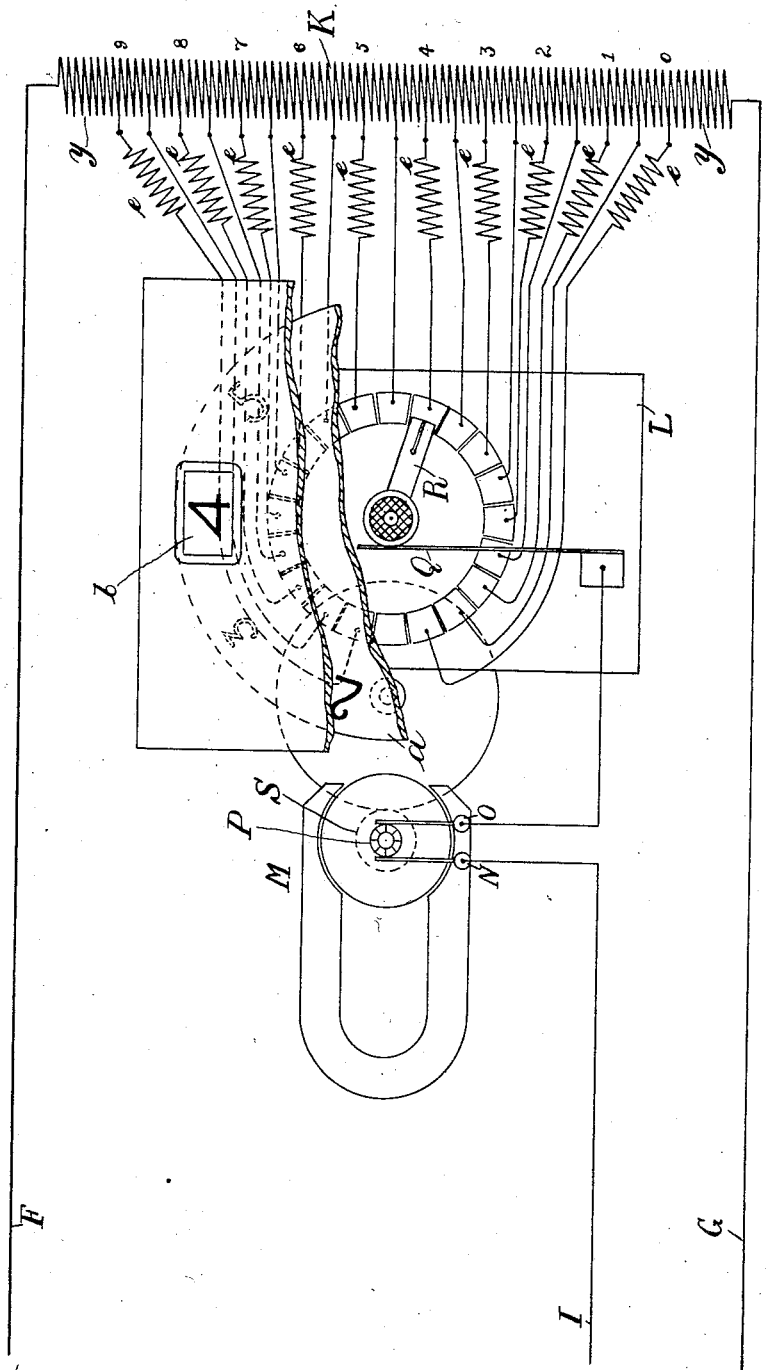

Figure 1 represents my improved receiving mechanism in combination with an ordinary transmitter in which exact correspondence of transmitter and receiver is secured by the use of a discontinuous gear of the counter type. Fig. 2 shows my improved mechanism, in which exact correspondence is secured by the use of intermediate contacts between the principal, or signal points, together with auxiliary resistances to prevent short-circuiting. Fig. 3 shows a modified form of receiving switch for the same purpose. Fig. 4 illustrates the application of my system by which several receiving mechanisms may be independently operated by means of one sub-dividing resistance. Fig. 5 illustrates my system when the position or motion of one transmitting mechanism is to be repeated by several receiving mechanisms, and Fig. 6 shows an alternative arrangement in which the field coils of the motor are provided with sub-divided resistance. Fig. 7 shows an alternative arrangement in which permanent magnets are used for the motor.

In all these figures, like letters refer to like parts, and it is to be understood that in order to illustrate my invention clearly, the drawings are in the form of diagrams, and a simple form of indication is shown therein, in order that the relation between the position of the transmitting and receiving switches and the corresponding position of the indicating mechanism may be readily understood. In all cases, the transmitting switch may either be worked by hand if it is required to transmit signals, or orders at will, or it may be connected to any mechanism, the position of which is to be indicated or reproduced at a distant point.

In Fig. 1, A is the transmitting station and B the receiving station. I show a transmitting switch C adapted to make contact by means of the arm D with any one of the contacts of a multiple point switch which is connected to the sub-dividing points of the transmitting resistance E. These subdividing points are numbered 0 to 9 on the drawing and corresponding numbers may be indicated by means of a pointer on the switch handle. The terminals of the subdivided resistance are connected to two wires F and G, hereinafter referred to as the supply wires, and the switch arm D is connected by means of a rubbing contact H with a wire I, hereinafter referred to as the balancing wire. A battery J, or other suitable source of electric energy, is connected at any convenient points with the supply wires.

At the receiving station B the supply wires are connected to a subdivided resistance K, which has its subdividing points numbered 0 to 9 respectively, connected to a multiple point switch L. The balancing wire circuit after traversing the armature M of an electric motor, by means of the brushes N, O and commutator P, is led to a rubbing contact Q in connection with the switch arm R. The motor armature is geared to the axle which carries the switch arm R, by means of a pinion S gearing into a wheel T, on the axle of which is a second pinion U gearing into the wheel V, the switch arm R being fixed upon the axle of V. The axle of T and U carries a disk W, on the lower surface of which a single tooth X is fixed which once in every revolution comes into gear with the pin wheel Y, and drives it forward or backward by the space of two pins Z, which in the example taken, is equal to one-tenth of a revolution. The pin-wheel axle carries the indicating device; in the example taken, this is a disk $a$ having digits or other indicating devices marked upon it, one of which is visible at a time through a window $b$ in a dial $c$. The gear ratio of U to V must of course correspond with that of the disk W to the pin-wheel Y.

I show the exciting coils $d$ of the motor connected to the supply wires F and G; this being the simplest means of obtaining the necessary magnetizing force. But where it is necessary to economize power I wind the subdividing resistance K in a form suitable for field coils as shown in Fig. 6, and arrange them on the field magnet of the motor, so that they may serve both as the subdivided resistance and as the field-exciting coils. It may happen that this last arrangement is impracticable, either by reason of want of space on the motor, or of the complicated connections required, in which case I may use permanent magnets for providing the magnetic field of the motor as shown in Fig. 7.

The discontinuous gear or counter mechanism shown in Fig. 1 is that already referred to and described and illustrated in U. S. A. Patent Specification No. 297670; this form of counter gearing presenting the advantage that when the single tooth is engaged in the pins, the motion of the pin-wheel is effected with a minimum of friction, while when not so engaged the pin-wheel is effectually locked by means of the locking ring $W^1$.

In Fig. 1 the transmitting and receiving switches are standing on corresponding switch contacts, namely those connected with point No. 6 on the transmitting resistance, and point No. 6 on the receiving resistance. These two points being at the same potential, no current traverses the balancing wire or armature and the receiving mechanism is at rest, the indicating device being securely locked by the counter gear. If, now, the transmitting switch is moved to another point, for example point No. 8, the potential at the transmitting end of the balancing wire will be two points in excess of the potential at point No. 6 at the receiving end, and hence a current will traverse the motor and drive it in a counter clock-wise direction until the receiving switch arm stands upon contact point No. 8. At this moment the balancing current will fall to zero and the friction and other retarding forces acting upon the motor will bring it to rest in a few revolutions. In the course of this movement, the wheel W will have made two revolutions and been engaged twice with the pin-wheel, so that the latter will have moved forward by two steps or two-tenths of a revolution, and the digit 8 will have been brought to the window $b$.

It will be seen that the exact position in which the motor comes to rest does not affect the position of the pin wheel and indicating device; so long as the single tooth X has passed through its engagement with the pin wheel, it is of no importance precisely where it comes to rest, and hence the position of the indicating device corresponds exactly with the position of the transmitting switch C, and the repetition of the movements of the transmitting mechanism is independent of the precise value of the friction, hysteresis, and other retarding influences acting upon the receiving mechanism, and independent likewise of other causes of lack of exact correspondence, such as inequality in the subdivisions of the transmitting and receiving resistances, and so on.

In Fig. 2, I show an alternative method of securing exact correspondence, in which the receiving resistance has an intermediate point of subdivision between each pair of principal points, and the receiving switch likewise has intermediate contacts. With this arrangement it is necessary to insert auxiliary resistances e in the wires connecting the principal potential points of the receiving resistance with the principal contacts of the switch, in order that when the switch arm R projects over two contacts it shall not short-circuit that section of the receiving resistance which is between the two points in question. The effect of this arrangement is that it is impossible for the motor to come to rest unless the switch arm R stands exactly at the center of the principal contact corresponding with the position of the transmitting switch and out of contact with the intermediate contacts on either side of it.

In Fig. 2 I show both switches standing at point No. 4 and if the receiving switch should be moved either one way or the other sufficiently far to touch the neighboring intermediate contact a balancing current would immediately traverse the motor and restore the switch to its correct position.

In order that the fall of potential along the resistance K should not be materially changed when the arm R touches two contacts, the auxiliary resistance must be at least four or five times as great as the resistance of one principal subdivision in the receiving resistance. The precision of indication with this modification depends on the width of the contact arm R; this is made just so wide that when standing on any principal contact it very nearly touches the adjacent intermediate contacts on either side of it, so that if it moves by a very small amount in either direction it comes into contact with one or other of them, and the motor thereupon restores it to its correct position.

In Fig. 3 I show a modified form of switch for securing the same exact correspondence without the necessity for doubling the number of subdivisions in the receiving resistance. In this modification I arrange the principal contacts of the switch in two concentric rings, the contacts being alternately in one ring and the other. I then provide two contact arms f and g, f being adapted to traverse the outer ring of contacts, and g the inner ring. These arms are attached to an insulating support h and they are electrically connected to each other by means of an auxiliary resistance e. The balancing wire is connected to the middle point of this auxiliary resistance by means of the rubbing contact Q and contact ring i. Dummy or blank contact plates j are fixed in between the working or principal contacts in order to enable the switch arms to travel smoothly from one contact to the next. This switch acts on exactly the same principle as that shown in Fig. 2; in the position shown in Fig. 3, the switch arm f is making contact with point No. 6, while switch arm g stands on a blank contact, and is therefore insulated; hence the balancing wire is connected to point No. 6 through half of the auxiliary resistance. If, now, the switch is moved by a very small amount in one direction or the other so that switch arm g touches a neighboring principal contact (say for example contact No. 5), that section of the receiving resistance which lies between points Nos. 5 and 6 is shunted by the auxiliary resistance e and hence the potential at the center of the auxiliary resistance is midway between the potentials of points 5 and 6; so that, assuming the transmitting switch to be standing at the points corresponding to No. 6 a current will flow through the balancing wire and motor, and the receiving switch will be restored to its correct position with switch arm g at rest exactly on the center of the blank contact, and not in contact either with contact 5 or contact 7.

It will be seen that the auxiliary resistance in Fig. 3 is made to serve two functions, namely, to provide a potential point midway between any two principal points, and also to avoid short-circuiting any section of the receiving resistance.

In Fig. 4, I show how several transmitting switches having independent switch arms $D^1$, $D^2$, and $D^3$ may be made to transmit from a single subdivided transmitting resistance, by a single pair of supply wires, F G through several balancing wires $I^1$, $I^2$ and $I^3$ to several independent receiving switch arms $R^1$, $R^2$ and $R^3$ which work on a single receiving resistance; these receiving switches being independently controlled by means of motor armatures $M^1$, $M^2$ and $M^3$. Such an arrangement as this forms a convenient means of transmitting any independent series of orders from one position to another; for example, with three motors I may control three indicating disks or drums, upon each of which the digits 0 to 9 are marked and shown through three windows in a row in a dial, so that any desired number from 0 to 999 may be exhibited at the receiving station by manipulating the three transmitting switch handles $C^1$ $C^2$ and $C^3$ at the transmitting station.

In Fig. 5, I show how a single transmitting apparatus may be made to simultaneously control a number of receiving mechanisms placed at receiving stations $B^1$ $B^2$ $B^3$ etc. This diagram, being self-explanatory, needs no description, but it illustrates the means I employ for providing a tell-tale by which the person who is operating the transmitting apparatus can be sure that all the receivers have responded accurately. This is easily effected by the insertion of any suitable detector galvanometer k in the circuit of the balancing wire.

When a number of transmitting switches are employed for signaling a number composed of several digits, (the several switches corresponding to the units, tens and hundreds digits in the number to be transmitted), it may be preferable to arrange each switch so that it may pass from 9 to 0 without traveling back along the other points. In other words the balancing wire may be quite suddenly shifted from potential point No. 9 to potential point No. 0 and until the motor has attained sufficient speed an excessive current would traverse it and tend to produce destructive sparking at the commutator. To avoid this possibility I may insert an extra pair of sections both in the transmitting and receiving sub-dividing resistances and I have shown these in my drawing. In Figs. 1, 2 and 3 the two additional sections in the transmitting resistance are shown at $x$ $x$ and the corresponding additional sections in the receiving resistance are shown at $y$ $y$.

Having now described my invention what I claim and desire to secure by Letters Patent is:—

1. In receiving apparatus for repeating the movements of a transmitter, the combination of a bridge motor in a balancing circuit, a repeating device, a subdivided resistance, a multiple point switch connected to said resistance, gear connecting the repeating device and the switch to the bridge motor and means for securing exact correspondence of the receiver with the transmitter, substantially as described.

2. In receiving apparatus for repeating the movements of a transmitter the combination of a bridge motor in a balancing circuit, a repeating device, a subdivided resistance, a multiple point switch adapted to make contact with any subdivision of the said resistance, gear connecting the repeating device and the switch to the bridge motor, and auxiliary resistance adapted to secure exact correspondence of the receiver with the transmitter substantially as described.

3. In receiving apparatus for repeating the movements of a transmitter the combination of a bridge motor, a repeating device, a subdivided resistance, a multiple point switch adapted to make contact with any subdivision of the said resistance, gear connecting the repeating device and the switch to the bridge motor, and auxiliary resistances adapted to secure exact correspondence of the receiver with the transmitter, substantially as described.

4. In receiving apparatus for repeating the movements of a transmitter the combination of a bridge motor, a repeating device, a subdivided resistance having intermediate potential points between the principal points, a multiple point switch adapted to make contact with any one of the principal or intermediate potential points, gear connecting the repeating device and the switch to the bridge motor, and auxiliary resistance between the intermediate potential points and the switch adapted to secure exact correspondence of the receiver with the transmitter, substantially as described.

In testimony whereof I have signed my name to this specification in the presence of two subscribing witnesses.

SYDNEY EVERSHED.

Witnesses:
 RICHARD A. HOFFMANN,
 CHARLES CARTER.